(12) United States Patent
Strandjord et al.

(10) Patent No.: US 7,889,351 B2
(45) Date of Patent: Feb. 15, 2011

(54) SYSTEMS AND METHODS FOR MONITORING ANGLE RANDOM WALK

(75) Inventors: Lee K. Strandjord, Tonka Bay, MN (US); Norman Gerard Tarleton, Glendale, AZ (US); Darryl G. Busch, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 12/346,354

(22) Filed: Dec. 30, 2008

(65) Prior Publication Data
US 2010/0165349 A1 Jul. 1, 2010

(51) Int. Cl.
G01C 19/72 (2006.01)
(52) U.S. Cl. .................. 356/464; 356/460
(58) Field of Classification Search ............... 356/459, 356/460, 461, 464
See application file for complete search history.

(56) References Cited

U.S. PATENT DOCUMENTS

| | | | |
|---|---|---|---|
| 5,434,670 A | 7/1995 | Albers et al. | |
| 6,763,153 B2 | 7/2004 | Bennett | |
| 6,836,334 B2 | 12/2004 | Bennett | |
| 7,274,460 B2 | 9/2007 | Bowser | |
| 7,295,322 B2 | 11/2007 | Kristal et al. | |
| 7,324,206 B2 | 1/2008 | Spahlinger | |
| 7,333,209 B2 * | 2/2008 | Greening et al. | 356/464 |
| 7,710,576 B2 * | 5/2010 | Busch et al. | 356/460 |

OTHER PUBLICATIONS

Darryll Busch et al., Methods and Apparatus for Monitoring Angle Random Walk of a Fiber Optic Gyroscope, U.S. Appl. No. 12/045,616, filed Mar. 10, 2008.
European Patent Office, "European Search Report", Apr. 22, 2010, Published in: EP.
"IEEE Standard Speification Format Guide and Test Procedure for Single-Axis Interferometric Fiber Optic Gyros", Jan. 1, 1998, Publisher: IEEE, Published in: New York, NY, USA.

\* cited by examiner

*Primary Examiner*—Michael A Lyons
(74) *Attorney, Agent, or Firm*—Fogg & Powers LLC

(57) ABSTRACT

A gyroscope for determining an angular rate output. The gyroscope includes a first demodulator configured to demodulate an angular rate measurement at a first bias modulation frequency to determine the angular rate signal and a second demodulator configured to demodulate the angular rate measurement at a second bias modulation frequency to provide a signal with ARW information. The gyroscope further includes an ARW estimator that provides an output that is proportional to ARW that is then stored in a memory. The second bias modulation frequency is an even order harmonic of the first bias modulation frequency.

18 Claims, 4 Drawing Sheets

SYSTEMS AND METHODS FOR MONITORING ANGLE RANDOM WALK

GOVERNMENT INTEREST

The invention described herein was made in the performance of work under U.S. Government Contract No. N00030-05-C-0063 awarded by the United States Navy. The Government may have rights to portions of this invention.

BACKGROUND OF THE INVENTION

An important requirement for a fiber optic gyro (FOG) is the ability to monitor its health status or accuracy for health diagnostics. For most navigation systems including FOGs, angle random walk (ARW) is a major contributor to navigation errors. ARW is measured in units of degrees per root unit time that directly affects angular rate calculations, independent from other types of error (e.g., scale factor or bias error).

ARW monitors can provide valuable information for health diagnostics. Current systems and methods utilized to monitor ARW indirectly only monitor parameters affecting ARW instead of actual ARW. These indirect ARW determinations can lead to additional support costs as well accuracy issues, including false alarms or false negatives. These systems also require a large number of parameter monitoring devices that negatively increase system size, weight, and power consumption.

SUMMARY OF THE INVENTION

The present invention relates to a gyroscope for measuring an angular rate output. In accordance with one aspect of the invention, the gyroscope includes a first component configured to demodulate an angular rate measurement at a first modulation frequency to determine the angular rate output and a second component configured to demodulate the angular rate measurement at a second modulation frequency to determine an ARW output. The gyroscope also includes a memory configured to store the ARW output.

In accordance with another aspect of the invention, the second modulation frequency is an even order harmonic of the first modulation frequency.

In accordance with a further aspect of the invention, the gyroscope also includes a filter for filtering an angular rate measurement input of the second demodulator.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
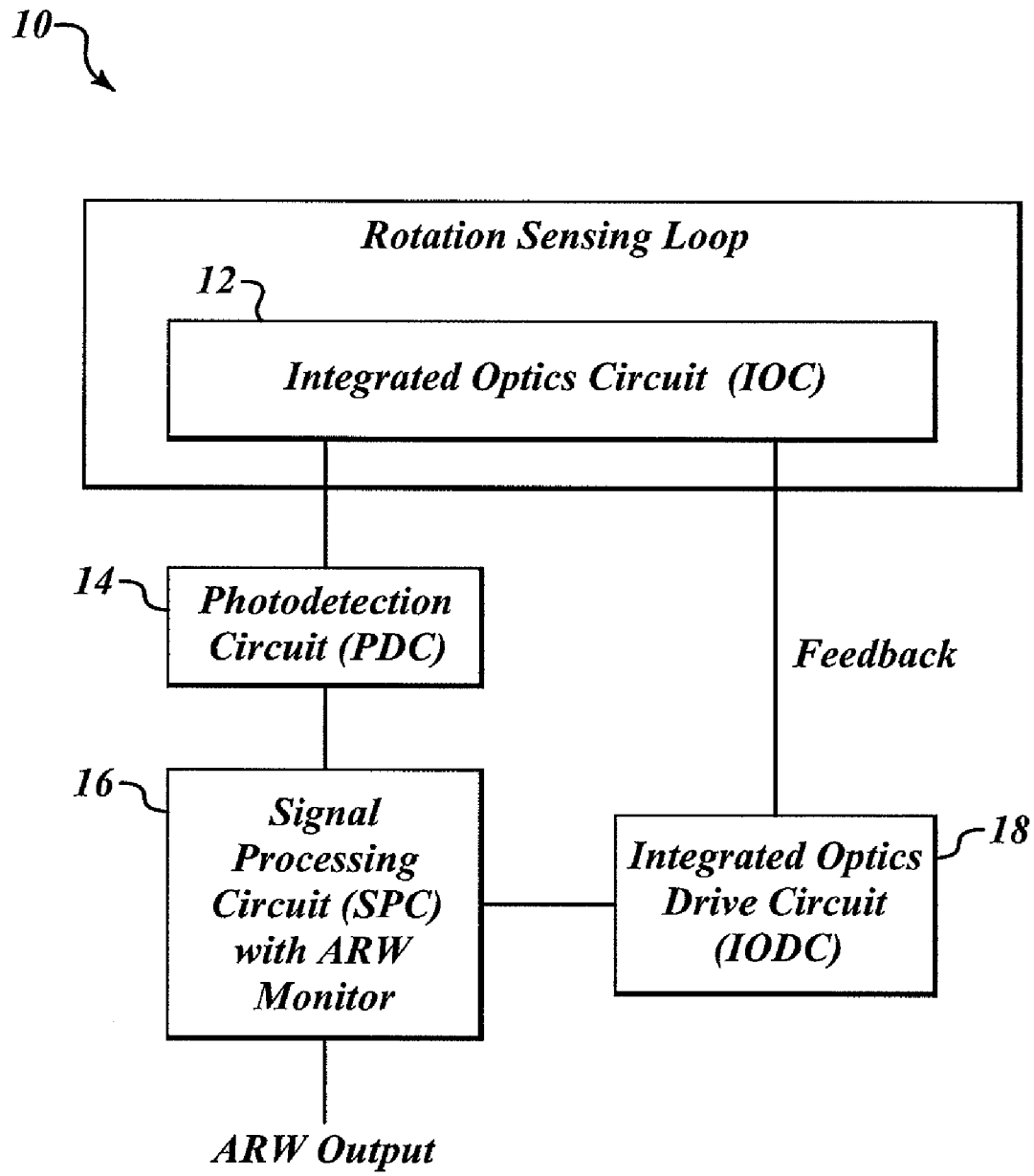
FIG. 1 illustrates a functional block diagram of an example gyroscope formed in accordance with an embodiment of the present invention.

The present invention is a gyroscope having a component for measuring angle random walk (ARW) of an angular rate output. FIG. 1 illustrates a simplified closed-loop architecture of a Fiber Optic Gyroscope (FOG) 10 formed in accordance with an exemplary embodiment of the present invention. The FOG 10 includes a rotation sensing loop having an integrated optics circuit (IOC) 12. The FOG 10 also includes a photodetection circuit (PDC) 14, a signal processing circuit (SPC) 16 with an ARW monitor, and an integrated optics drive circuit (IODC) 18.

The FOG 10 measures an angular velocity or a velocity about a particular axis of rotation by determining a difference in phase between two beams of light travelling in opposite directions (e.g., clockwise (CW) and counterclockwise (CCW) directions) around fiber optic coils of the IOC 12. An analog phase output signal from the IOC 12 is communicated to the PDC 14. The PDC 14 amplifies and converts the analog phase output signal to modulated digital phase shift data. The digital phase shift data of the PDC 14 is then communicated to the SPC 16. The SPC 16 demodulates, monitors for ARW, integrates, and then communicates the integrated result to the IODC 18. The IODC 18 converts the signal received from the SPC 16 to analog phase shift data, amplifies it, and then communicates the amplified analog phase shift data to the IOC 12 through a feedback loop. The IOC 12 then utilizes the received analog phase shift data to cancel a phase shift between the two beams of light travelling around the optical coils of the IOC 12.

Figure 2:
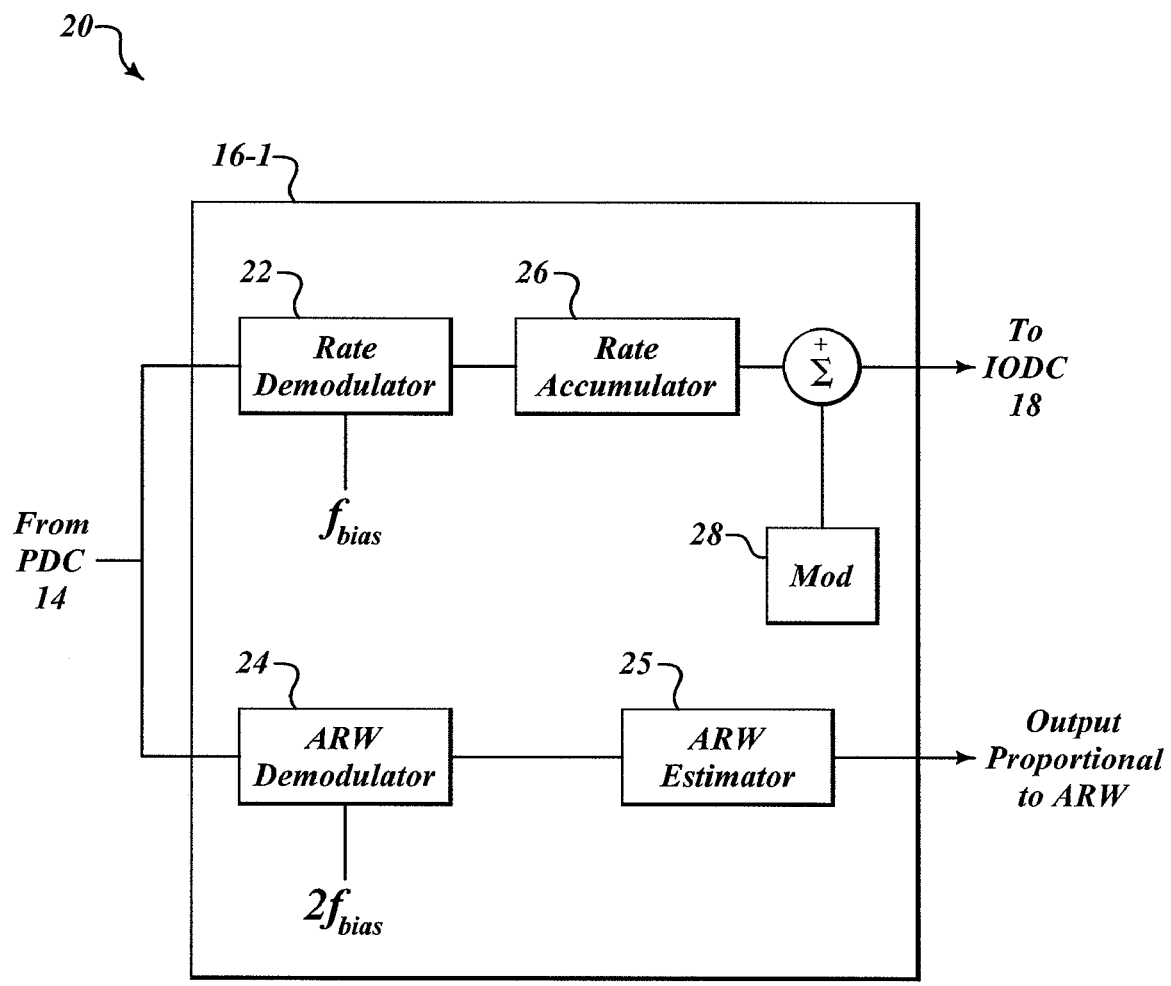
FIG. 2 illustrates a functional block diagram of an example signal processing circuit formed in accordance with an embodiment of the present invention.

FIG. 2 illustrates an SPC 16-1 component of a FOG 20 formed in accordance with an embodiment of the present invention. The SPC 16-1 includes an ARW demodulator 24 coupled to an ARW estimator 25, a rate demodulator 22 that is connected with a rate accumulator 26 and a modulator 28. The rate demodulator 22, the rate accumulator 26, and the modulator 28 provide digital phase shift data to the IODC 18 to cancel phase shifts induced by rotation.

In an embodiment, both the rate demodulator 22 and the ARW demodulator 24 receive the digital phase shift data from the PDC 14. The ARW demodulator 24 is biased at a predetermined modulation frequency, such that no adverse rotational rate or mechanical vibrational signals affect the signal being demodulated. By biasing the ARW demodulator 24 at this predetermined frequency the only noise affecting a modulated signal received from an IOC 12-1 is related to ARW. The precise selection of the predetermined modulation frequency is critical to determining real ARW, because the frequency band surrounding the bias modulation frequency of the rate demodulator 22 is corrupted by real rotation rates whereas much higher frequency bands are corrupted by mechanical vibrations.

Depending on the application, the rotation rates can be from baseband to a few hertz or DC to hundreds of hertz. Vibration signals can range from a few hertz to a couple of kilohertz. Acoustic induced signals can range from tens of hertz to several kilohertz. All of these ranges are about the bias modulation frequency, or odd harmonics of the bias modulation frequency.

At even harmonics frequencies of the bias modulation frequency, a noise measurement of a demodulated signal is essentially void of rotation or vibration signals. Therefore, by selecting a bias modulation frequency within narrow bands surrounding these even harmonics, a demodulated signal can provide real ARW information. In an embodiment, the ARW demodulator 24 is biased at two times the bias modulation frequency of the rate demodulator 22. In another embodiment, the ARW demodulator 24 is biased at four times the bias modulation frequency of the rate demodulator 22.

As shown in FIG. 2, the "ARW Output" from the ARW demodulator 24 is not a signal that is proportional to ARW, but rather it's root-variance (standard deviation) is proportional to ARW. Therefore, to get a signal that is proportional to ARW, an additional function is performed to the output of the ARW demodulator 24. In one embodiment, the added function could be a standard deviation calculation, or some other similar method that is related to the variance, such as a Fast Fourier Transform based spectral density. This function can reside in either the gyro processor SPC 16, a system processor (not shown—gyros integrated into a bigger system such as an inertial navigation unit (IMU)) or in a customer's system (not shown). The ARW estimator 25 performs the function that gives an output that is proportional to ARW. Then the output of the ARW estimator 25 is sent to memory. It is unlikely (but possible) that the output of the ARW demodulator 24 will go directly to memory because the data rates at this point are very high (40 kHz or higher) and therefore would require too much memory.

In one embodiment, the memory is included in an external health monitoring device (not shown), where the received proportional ARW output is tracked to determine the overall health of the FOG 20.

Figure 3:
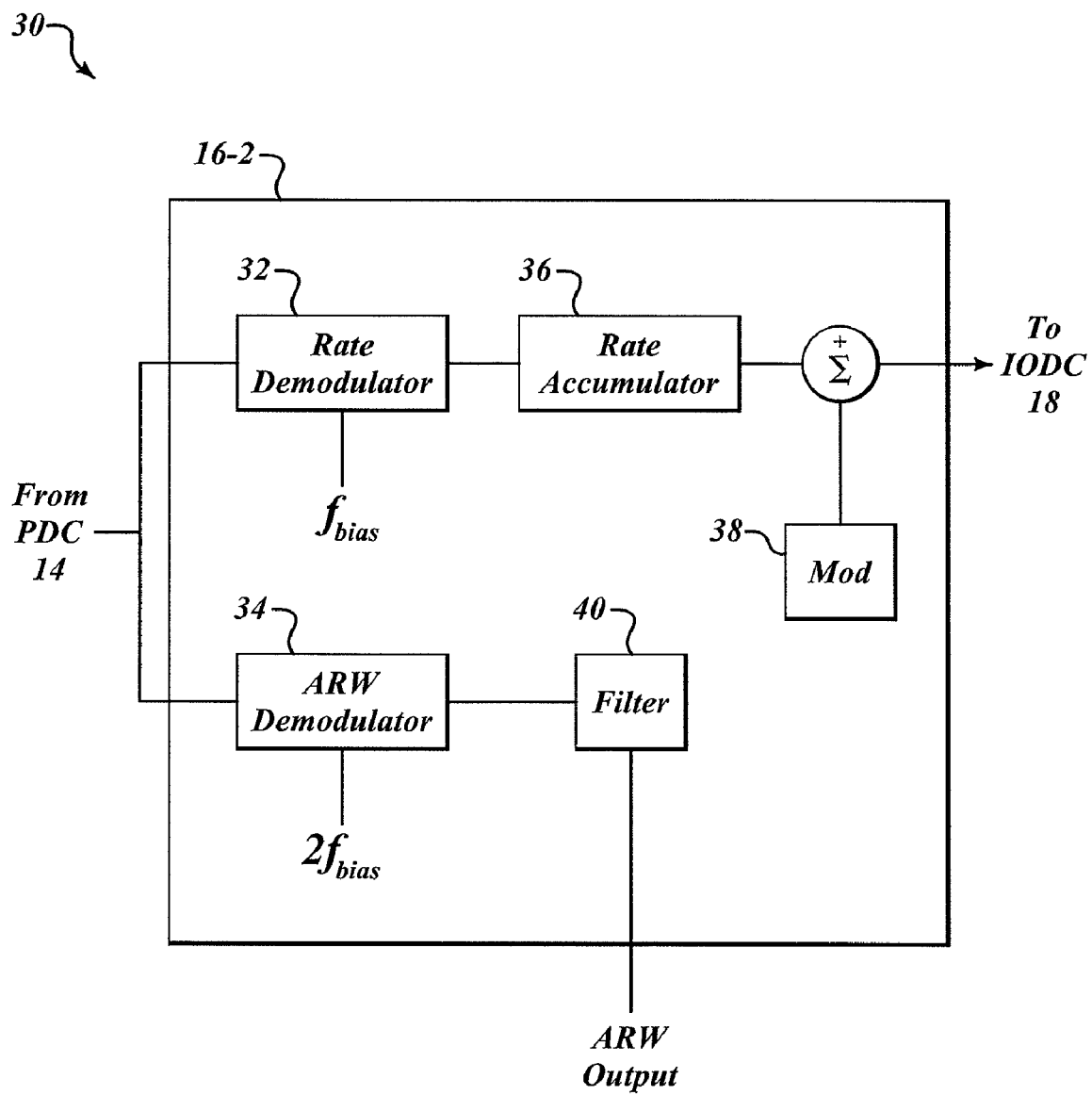
FIG. 3 illustrates a functional block diagram of an example signal processing circuit formed in accordance with an embodiment of the present invention.

FIG. 3 illustrates an SPC 16-2 component of a FOG 30 formed in accordance with another embodiment of the present invention. The SPC 16-2 includes an ARW demodulator 34 that is connected to a filter 40, and a rate demodulator 32 that is connected with a rate accumulator 36, and a modulator 38. In this embodiment, the ARW demodulator 34 sends a digital phase shift data to the filter 40. In one embodiment, the filter 40 includes a band pass filter that is utilized to filter a modulated phase shift data signal from the PDC 14 at a frequency band surrounding the predetermined ARW bias frequency The signal from the ARW demodulator 34 is filtered to select out a predetermined frequency band to further reduce any influence from corrupting signals. For example, the ARW monitor may have some corrupting signals at very low frequencies (well below 1 Hz) due to optical glitches caused by the IOC 12. The filter 40 has a pass band that is optimized to pass only those frequency components that has ARW information void of corrupting signals.

In another embodiment, the filter 40 includes processing circuitry that facilitates application of a fast Fourier transform (FFT) to transform received data between the time and frequency domains. The bandpass filter 40 or FFT help to reduce unwanted signal components related to real rotation and vibration information and modulation induced errors such as optical glitches from the IOC.

Figure 4:
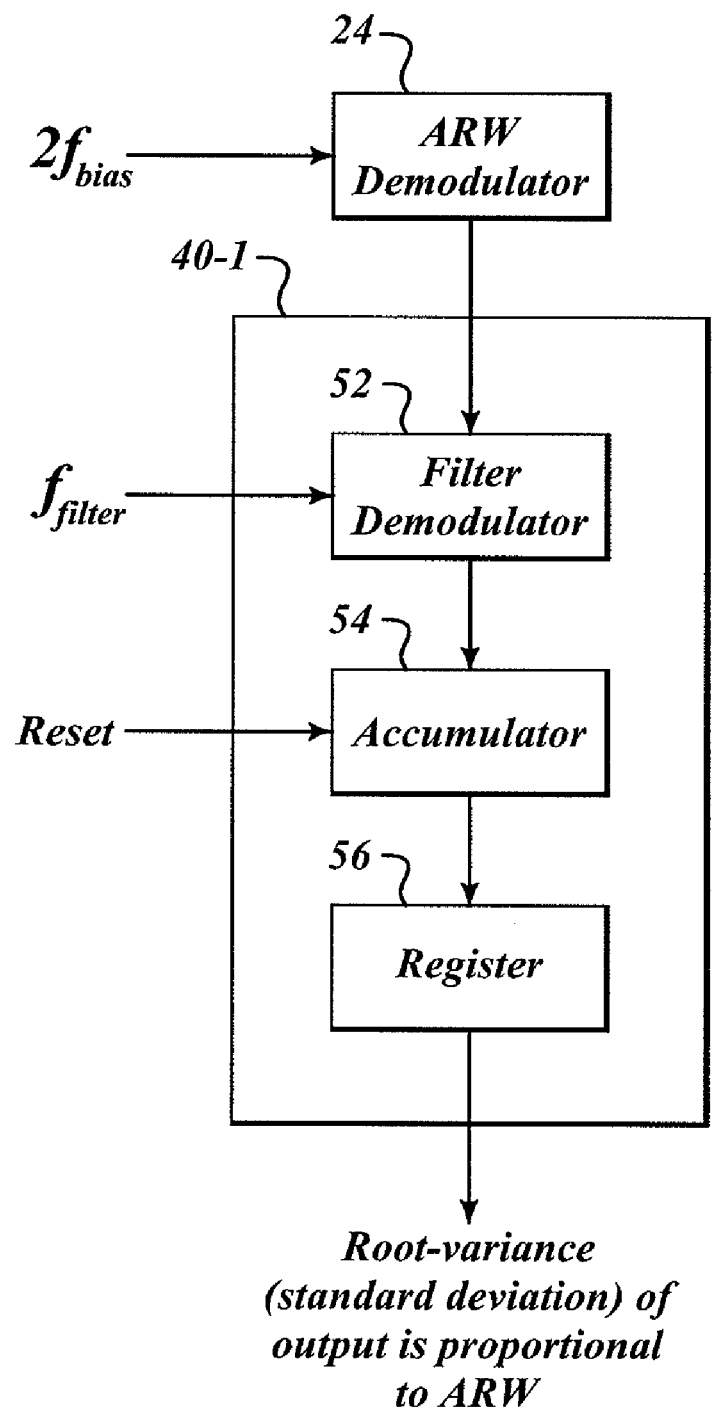
FIG. 4 illustrates an example filter used in accordance with an embodiment of the present invention.

FIG. 4 illustrates an example filter 40-1 that is placed after the ARW demodulator 24. The filter 40-1 includes a filter demodulator 52 that is biased at a predetermined frequency that is void of corrupting signals, such as modulation induced errors. After the filter demodulator 52 is a low pass filter, for example an accumulator 54 that accumulates the filter demodulator output over a predetermined time period. At the end of the accumulation period, the final count of the accumulator is saved into a register 56 and then the accumulator value is reset to zero. This process not only provides low pass filtering of the filter demodulator output, but also decreases the data rate, which may be necessary before the ARW data can be saved in memory and further processed by diagnostic algorithms. Using the accumulator 54 and the register 56 is a very efficient way in terms of processing cycles or FPGA or ASIC gates to do low pass filtering. By filtering with a demodulator followed by a low pass filter, a very narrow frequency band of the ARW demodulator output can be selected, thus greatly improving rejection of corrupting signals.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A gyroscope for determining an angular rate signal, the gyroscope comprising:
   a first component configured to demodulate an angular rate measurement at a first modulation frequency to determine the angular rate signal;
   a second component configured to demodulate the angular rate measurement at a second modulation frequency to provide a signal with angle random walk (ARW) information; and
   a third component configured determine the angular rate signal based on the angular rate measurement demodulated by the first and second components.

2. The system of claim 1, wherein the second modulation frequency is an even order harmonic of the first modulation frequency.

3. The system of claim 1, wherein the second modulation frequency is a second order harmonic of the first modulation frequency.

4. The system of claim 1, further comprising a filter configured to filter an output of the second demodulator.

5. The system of claim 4, wherein the filter is a bandpass filter.

6. The system of claim 4, wherein the filter includes a demodulator and a lowpass filter.

7. The system of claim 1, wherein the gyroscope is a closed loop fiber optic gyroscope.

8. The system of claim 1, further comprising an ARW estimator configured to receive the output of the second component and output a value that is proportional to ARW.

9. A method for determining an angular rate signal of a gyroscope, the method comprising:
   demodulating an angular rate measurement at a first modulation frequency to determine the angular rate signal;
   demodulating the angular rate measurement at a second modulation frequency to provide a signal with angle random walk (ARW) information; and
   determining the angular rate signal based on the angular rate measurement demodulated using the first and second modulation frequencies.

10. The method of claim 9, wherein the second modulation frequency is an even order harmonic of the first modulation frequency.

11. The method of claim 9, wherein the second modulation frequency is a second order harmonic of the first modulation frequency.

12. The method of claim 9, further comprising filtering the angular rate measurement after demodulating the angular rate measurement at the second modulation frequency.

13. The method of claim 9, wherein the gyroscope is a closed loop fiber optic gyroscope.

14. The method of claim 9, further comprising converting the signal with ARW information into an output that is proportional to ARW and storing the proportional output.

15. A system for determining an angular rate signal of a gyroscope, the system comprising:
   means for demodulating an angular rate measurement at a first modulation frequency to determine the angular rate signal;

means for demodulating the angular rate measurement at a second modulation frequency to provide a signal with angle random walk (ARW) information; and means for determining the angular rate signal based on the angular rate measurement demodulated using the first and second modulation frequencies.

16. The system of claim 15, wherein the second modulation frequency is an even order harmonic of the first modulation frequency.

17. The system of claim 15, further comprising means for filtering the angular rate measurement after demodulating the angular rate measurement at the second modulation frequency.

18. The system of claim 15, further comprising means for receiving the output of the second demodulator and outputting a value that is proportional to ARW.

* * * * *